(No Model.)
W. STODDARD.
SEED PLANTER.
No. 299,593. Patented June 3, 1884.
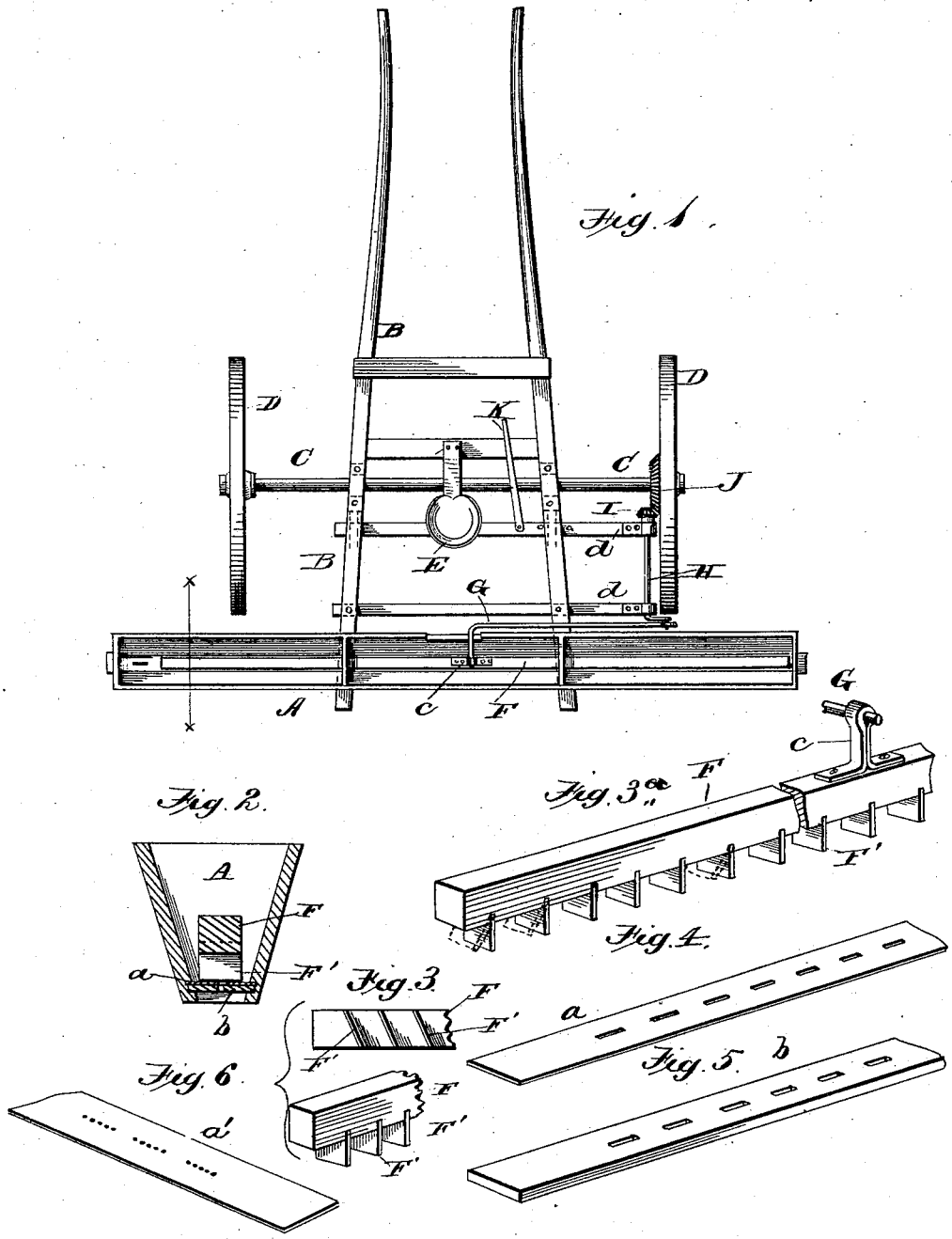

UNITED STATES PATENT OFFICE.

WILLIAM STODDARD, OF VALPARAISO, INDIANA.

SEED-PLANTER.

SPECIFICATION forming part of Letters Patent No. 299,593, dated June 3, 1884.

Application filed September 3, 1883. (No model.)

*To all whom it may concern:*

Be it known that I, WILLIAM STODDARD, a citizen of the United States, residing at Valparaiso, in the county of Porter and State of Indiana, have invented certain new and useful Improvements in Seed-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in seed-sowers, having for its object to enable the proper dropping of the seed in a simple and expeditious manner; and it consists of a sliding or agitating bar with a series of depending teeth or plates, said bar being operated by mechanism substantially as hereinafter more fully set forth and claimed.

In the accompanying drawings, Figure 1 is a plan view of my improved seed-sower. Fig. 2 is a cross-section taken on the line $x\ x$ of Fig. 1. Fig. 3 is a perspective and bottom plan view of the seed-bar or agitator partly broken away. Fig. 3$^a$ is a perspective view of a modification of the seed bar or agitator, showing the teeth depending therefrom at a right angle, the dotted lines showing said plates or teeth bent slightly to one side of a right angle to said bar. Figs. 4 and 5 are similar views of the cut-off and the apertured seed-box bottom removed. Fig. 6 is the cut-off for smaller seed—timothy or clover seed.

In carrying out my invention I preferably mount a hopper, A, on the rear projecting ends of the shafts B of a horse hay-rake otherwise denuded of any other identity with that implement or contrivance, save that the gearing that was employed for operating the rake-teeth is applied to operate the seed bar or slide, as will be presently described. The shafts are secured upon an axle, C, having wheels D. A seat, E, is suitably secured upon a stiff spring-bar fastened to a cross-piece of the shafts.

F is the seed bar or agitator to slide within the hopper over the apertured seed-opening regulator or cut-off $a$, itself disposed to be moved over the apertured seed-hopper bottom $b$ to cut off the dropping or sowing of the seed when the machine is being turned or not in use.

$a'$ is the timothy or clover seed slide or agitator, which is designed to replace the regulator or cut-off $a$ when such seed is sown.

The seed bar or agitator F is provided with a series of downward projecting or depending teeth or plates, F', the lower edges of which rest lightly on the cut-off $a$, the agitator-bar being partially supported by the crank-rod G.

To an upright bracket, $c$, secured to the upper side of the agitator F, is connected a cranked rod, G, which extends through a slot in the hopper A and parallel with the front side of the hopper. With the outer end of this rod is connected a crank-shaft, H, journaled in boxes on the projecting ends of two cross-bars, $d\ d$, of the shafts B. Said shaft H is provided at one end with a beveled gear wheel or pinion, I, which gears with a similar wheel, J, on the hub of one of the driving-wheels D, whereby movement is imparted to the seed-bar. The bars $d\ d$, carrying the shaft H, having the gear wheel or pinion I, are connected to and adapted to be moved by a hand-lever, K, so as to put said wheel into and out of engagement with the driving-wheel pinion J, whereby the seed-agitator F F' may be thrown into and out of action, as may be required.

The points of novelty which I deem to be important are, first, the arrangement and construction by which the running-gear, frame, and teeth-operating gear of an ordinary horse hay-rake may be used efficiently in this device; and, second, removably locating the hopper on the rear extensions of the shafts. This construction allows the parts which identify the device as a rake or a planter to be readily changed one for the other, and allows the seed-operating devices to have firm bearings and free play.

I am aware that a bar carrying a series of tufts of brushes has been used; but such tufts, spreading at their bottoms, form chambers between adjacent tufts, in which the quick vibrations of the bar serve to detain the seed or grain.

Having thus fully described my invention, what I claim, and desire to secure by Letters Patent, is—

1. In a seed-planter, substantially as described, in combination with the hopper, cut-off, and feed-operating gear, as G H I J, the bar F, having a series of rigid depending plates, F', of equal width throughout and in number and location corresponding to the feed-apertures, as set forth.

2. The removable hopper A, secured to the rear of the shafts B, the feed-bar F F', as described, the gear-connections, as G H, the gear I, and lever K, all constructed and arranged to serve with the parts B C D J of an ordinary hay-rake, as set forth.

In testimony whereof I affix my signature in presence of two witnesses.

WILLIAM STODDARD.

Witnesses:
BILLA STODDARD,
JOHN H. GILLETT.